(12) United States Patent
Ohashi

(10) Patent No.: US 7,466,898 B2
(45) Date of Patent: Dec. 16, 2008

(54) INFORMATION PROCESSING APPARATUS AND INFORMATION PROCESSING METHOD

(75) Inventor: Takeshi Ohashi, Kanagawa (JP)

(73) Assignee: Sony Corporation (JP)

( * ) Notice: Subject to any disclaimer, the term of this patent is extended or adjusted under 35 U.S.C. 154(b) by 455 days.

(21) Appl. No.: 11/298,674

(22) Filed: Dec. 12, 2005

(65) Prior Publication Data
US 2006/0136496 A1  Jun. 22, 2006

(30) Foreign Application Priority Data
Dec. 17, 2004  (JP)  ............ P2004-366579

(51) Int. Cl.
*H04N 7/00* (2006.01)
*H04N 5/91* (2006.01)
(52) U.S. Cl. ............ 386/46; 386/83
(58) Field of Classification Search ............ 386/46, 386/83, 125, 124, 45, 52
See application file for complete search history.

(56) References Cited

U.S. PATENT DOCUMENTS
2003/0016943 A1* 1/2003 Chung et al. ............ 386/46

FOREIGN PATENT DOCUMENTS
JP  02-120987  5/1990
JP  06-084032  3/1994

OTHER PUBLICATIONS

Derwent—Title—"Book Marking of audio/video streams for playback at another time when selecting and audio or video stream from the Internet". Publication No. RD 437117 A. Dated Sep. 10, 2000.*

* cited by examiner

*Primary Examiner*—Robert Chevalier
(74) *Attorney, Agent, or Firm*—Rader Fishman & Grauer PLLC; Ronald P. Kananen

(57) ABSTRACT

The present invention provides an information processing apparatus that recognizes each individual user and automatically reproduces the program recorded by the user if the video recorder is shared by a plurality of users. The information processing apparatus includes a recording/reproduction unit that records a program produced by using video and audio signals to a recording medium contained in and/or removably fitted to the apparatus and reproduces and displays it on a display apparatus, an identification processing unit that recognizes and identifies the individual user reproducing and viewing the program recorded on the recording medium, and a bookmark information processing unit that associates each user with bookmark information by using user identification information of the user identified by the identification processing unit and program information obtained by the recording/reproduction unit, holding the bookmark information associated with each user and controls the operation of reproducing a program by the recording/reproduction unit by using the bookmark information associated with each user.

20 Claims, 13 Drawing Sheets

| User A | |
|---|---|
| Program ID | Viewed hours /total program hours |
| 4 | 0:00/2:00 |
| 7 | 0:00/1:00 |
| 8 | 0:45/1:00 |
| I | 0:00/2:30 |
| II | 0:00/2:15 |

| User B | |
|---|---|
| Program ID | Viewed hours /total program hours |
| 4 | 0:00/2:00 |
| 6 | 0:00/0:30 |
| I | 2:30/2:30 |
| II | 0:00/2:15 |

| User C | |
|---|---|
| Program ID | Viewed hours /total program hours |
| 1 | 1:00/2:00 |
| 6 | 0:15/0:30 |
| 8 | 1:00/1:00 |
| I | 2:30/2:30 |
| II | 0:00/2:15 |

FIG.7

| Program ID | Program title | Medium ID | Medium location | Pointer to program data | Program data length (hours) |
|---|---|---|---|---|---|
| 1 | History Road | DVD-R-1 | Shelf 1 | 0x00000000 | 2:00 |
| 4 | Music Concert 21 | DVD-R-2 | Shelf 2 | 0x080AD6B9 | 2:00 |
| 6 | Early Morning News | HD | Contained in main body | 0x20C0D607 | 0:30 |
| 7 | Everyday Cooking | HD | Contained in main body | 0x4A50D923 | 1:00 |
| 8 | TV Clinic | HD | Contained in main body | 0x7B262C98 | 1:00 |
| I | Giant Cong | DVD-1 | Shelf 2 | 0x00000000 | 2:30 |
| II | Star Fighters | DVD-2 | Shelf 2 | 0x00000000 | 2:15 |

FIG.8

INFORMATION PROCESSING APPARATUS AND INFORMATION PROCESSING METHOD

CROSS REFERENCES TO RELATED APPLICATIONS

The present invention contains subject matter related to Japanese Patent Application JP 2004-366579 filed in Japanese Patent Office on Dec. 17, 2004, the entire contents of which being incorporated herein by reference.

BACKGROUND OF THE INVENTION

1. Field of the Invention

This invention relates to an information processing apparatus and an information processing method for recording information, such as video and audio signals, to and reproducing such information from a recording medium contained in and/or removably fitted to the apparatus.

2. Description of the Related Art

Many video recording/reproduction apparatuses (video recorders) are adapted to use a hard disc as a recording medium (video medium) so as to record and accumulate broadcast television programs there. Since a hard disc has a recording capacity that is in the range from 80 GB to 250 GB and hence by far larger than an optical disc, the user is not required to mind the free space left in the hard disc when recording television programs. For example, a hard disc with a recording capacity of 250 GB can be used to record signals maximally for about 325 hours (in an SLP mode).

When reproducing a recorded program, the user can have a list of the titles of the recorded programs displayed on a monitor screen as an image and select the program he or she wants to watch by operating a remote control unit. Then, the program is reproduced from the hard disc by the video recorder.

When the family members of the user share a single video recorder that uses a video medium, such as a hard disc, an optical disc or a video tape, there may be cases where two or more than two family members want to record a same television program. In such a case, the family members who want to record the program generally do not operate the video recorder separately to record the program on the video medium but record it on the video medium by a single operation.

Particularly, when the video medium can be used repeatedly for recording programs, the family members who have already enjoyed the program may want to erase it. However, then there arises a problem that it is not clear if all the family members who want to watch the program have already enjoyed it or not.

To date, there are three ways that can be used to resolve this problem. They include (1) recording the program simultaneously as many times as the number of the family members who want to record it, (2) checking with each of the family members directly if he or she agrees to erase it and (3) each of the family members inputs information telling that he or she has already watched the program and hence agrees to erase it by means of a button of the remote control unit.

However, (1) is inefficient from the viewpoint of effective use of the recording medium because the same program needs to be recorded as many times as the number of the family members and (2) can be time consuming because it is necessary to check each of the family members who share the same video recorder if he or she agrees to erase the program, whereas (3) is cumbersome because each of the family members has to operate the button of the remote control unit.

Additionally, there are video recorders that can reproduce a program from a point of interruption if the ongoing reproduction of the program is interrupted at the point. But, then, if some other person operates the video recorder for reproduction, the program interrupted by the previous user may be reproduced from the point of interruption. If the video recorder is so devised that different users can select the point from which a program can be reproduced, operating related one or more than one related buttons of the remote control unit will be a cumbersome operation.

Thus, there is a demand for an information processing apparatus and an information processing method for recognizing individual users when any of them operates a video recorder to reproduce a television program and watch it on the display screen of a television receiving set or the like and automatically reproducing the program to display it on the display screen for the recognized user.

Patent Document 1 (Jpn. Pat. Appln. Laid-Open Publication No. H6-084032) describes a viewing monitoring method of a television receiving set for periodically scanning the viewable range of a television receiving set by means of a distance sensor arranged near the television receiving set and monitoring the presence or absence of a viewer in the viewable range according to the output of the distance sensor and the output of the distance sensor obtained in advance by a sensing operation of the distance sensor when there was no viewer in the viewable range.

Patent Document 2 (Jpn. Pat. Appln. Laid-Open Publication No. H2-120987) describes a method of monitoring the presence or absence of a viewer of a television receiving set by means of an image recognition process conducted on the image obtained by an image sensing operation of a two-dimensional image sensor in the viewable range of the television receiving set.

SUMMARY OF THE INVENTION

The above-cited Patent Documents 1 and 2 disclose techniques only for accurately monitoring the viewer who is watching a television receiving set and arrangements for monitoring the viewer and hence they do not disclose any arrangement for recognizing each individual user when he or she is trying to watch the program that has been recorded in advance by the user by means of a video recorder and automatically reproducing and displaying the recorded program on the display screen of the television receiving set if the video recorder is shared by a plurality of users.

In view of the above-identified circumstances, it is therefore desirable to provide an information processing apparatus and an information processing method for recognizing each individual user and automatically reproducing the program recorded by the user if the video recorder is shared by a plurality of users.

According to the present invention, there is provided an information processing apparatus including: a recording/reproduction means for recording a program produced by using video and audio signals to a recording medium contained in and/or removably fitted to the apparatus and reproducing and displaying it on a display apparatus; an identification processing means for recognizing and identifying the individual user reproducing and viewing the program recorded on the recording medium; and a bookmark information processing means for associating each user with bookmark information by using user identification information of the user identified by the identification processing means and program information obtained by the recording/reproduction means, holding the bookmark information associated with each user and controlling the operation of reproducing a program by the recording/reproduction means by using the bookmark information associated with each user.

Thus, the bookmark information processing means associates each user with bookmark information by using the user identification information of the user and program information, holds the bookmark information and controls the operation of reproducing a program by using the bookmark information associated with each user.

According to the present invention, there is also provided an information processing method including: a recording/reproduction step of recording a program produced by using video and audio signals to a recording medium contained in and/or removably fitted to an information processing apparatus and reproducing and displaying it on a display apparatus; an identification processing step of recognizing and identifying the individual user reproducing and viewing the program recorded on the recording medium; and a bookmark information processing step of associating each user with bookmark information by using the user identification information of the user identified in the identification processing step and the program information obtained in the recording/reproduction step, holding the bookmark information associated with each user and controlling the operation of reproducing a program in the recording/reproduction step by using the bookmark information associated with each user.

Thus, the bookmark information processing step associates each user with bookmark information by using the user identification information of the user and program information, holds the bookmark information and controls the operation of reproducing a program by using the bookmark information associated with each user.

With an information processing apparatus and an information processing method according to the invention, the bookmark information processing means and step associate each user with bookmark information by using the user identification information of the user and program information, holds the bookmark information and controls the operation of reproducing a program by using the bookmark information associated with each user so that, when an individual user reproduces a recorded program and watches it by means of a television receiving set, the user is recognized and the recorded program is automatically reproduced for the user.

Thus, according to the invention, the viewing situation of each user who is viewing a program is presented and the information on the viewing situation is updated without requiring the user to do a cumbersome operation using a remote control unit. A user can select a program that he or she wants to watch from a program menu that shows one or more than one programs the user has not seen simply by sitting in front of the television receiving set. If the recording medium is a removable medium, the location where it is stored is also displayed so that the user can find it easily without making any effort to find it.

Additionally, one or more than one programs that two or more than two users have not seen are also displayed in the menu so that they may be able to enjoy the same recorded program. If one of the users has seen a leading half of a program, the user may be called when the reproduction of the program proceeds to the point where the user stopped viewing so that the called user can enjoy the remaining half of the program with the other viewer or viewers. If a recording medium is a reusable one, information telling that the recorded program can be erased when all the users who want to watch it have seen it will be displayed so that the recording medium can be utilized very efficiently.

BRIEF DESCRIPTION OF THE DRAWINGS

FIG. 7 is a schematic illustration of bookmark information;

FIG. 8 is a schematic illustration of correspondence between program IDs and program information and media information;

DETAILED DESCRIPTION OF THE PREFERRED EMBODIMENTS

Now, a preferred embodiment of the present invention will be described. This embodiment is a recording/reproduction apparatus for recording/reproducing audio/video (AV) information signals, using a recording medium that may be a hard disc or an optical disc. Particularly, the recording/reproduction apparatus can recognize the person or persons watching the video/audio program being reproduced and hold information on who viewed which program to what point on the way so that it can control the operations of reproducing recorded programs for each user (of a plurality of users) by using the information it holds.

Figure 1:
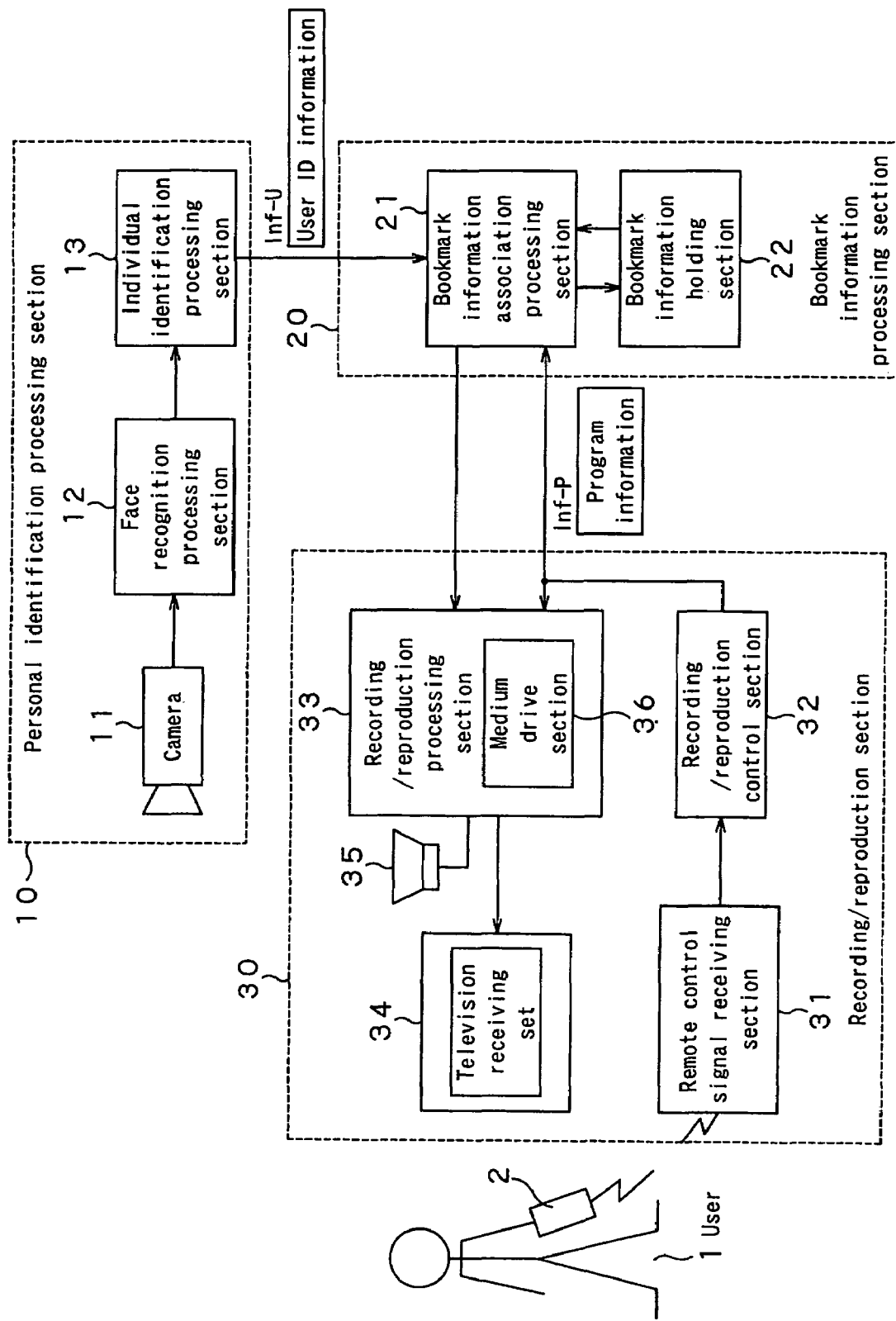
FIG. 1 is a schematic block diagram of a recording/reproduction apparatus.

FIG. 1 is a schematic block diagram of the recording/reproduction apparatus. The recording/reproduction apparatus includes a personal identification processing section 10 for identifying each person 1 watching a video program that is being reproduced, a bookmark information processing section 20 for processing information on who viewed which program to what point on the way and a recording/reproduction section 30 for recording/reproducing a television program according to an operation by a user.

The personal identification processing section 10 includes a camera 11 that specifically operates as an image input section for projecting an image of a subject, or a user on an image pickup device, such as CCD, and transforming the image into electric imaging signals so as to input the image to the apparatus, a face recognition processing section 12 for recognizing the face of the user who is watching a television program according to the imaging signals from the camera 11 and an individual identification processing section 13 for generating user identifying (ID) information from the outcome of the recognition by the face recognition processing section 12. The camera 11 is part of the cabinet of the recording/reproduction apparatus that is arranged at a position good for picking up an image of the user watching the television program being displayed on the television receiving set 34. Of course, the camera 11 may be separated from the cabinet and arranged near or on the television receiving set 34.

With the above-described arrangement, the personal identification processing section 10 can recognize whether or not there is a user watching the television receiving set 34 of the recording/reproduction section 30, which will be described in greater detail hereinafter, and if there is, which user is it from the image obtained by the camera 11 or the image input section, and supply the bookmark information processing section 20 with the user ID information obtained as an outcome of the identification process. Of course, some other device may be used in place of the camera 11 for the personal identification processing section 10 if the device can identify individuals. The face recognition processing section 12 of the personal identification processing section 10 will be described in greater detail hereinafter for its specific configuration.

The recording/reproduction section 30 includes a remote control signal receiving section 31 for a reproduction or recording command from the user 1 who operates a remote controller 2, a recording/reproduction control section 32 for generating a control signal for a reproduction or recording process according to the reproduction or recording command received by the remote control signal receiving section 31, a recording/reproduction processing section 33 for reproducing the program of the television channel specified by the user and displaying it on the television receiving set 34 or recording the video/audio signals of the program on the hard disc contained in the apparatus or on a removable optical disc or some other recording medium according to the control signal for the reproduction or recording process, whichever is appropriate, a monitor 34 belonging to the television receiving section (to be referred to simply as a television receiving set hereinafter) and a speaker 35. The recording/reproduction processing section 33 includes a medium drive section 36 for driving the contained hard disc, the removable optical disc or some other recording medium. The recording/reproduction section 30 also has a tuner for selecting a television channel and receiving the program being broadcast. Alternatively, the tuner of the television receiving set 34 may be used to select a television channel.

With the above-described arrangement, upon receiving a recording or reproduction command from the user 1 of the remote controller 2, the recording/reproduction section 30 records the video/audio signals of the program of the channel specified by the user on the hard disc contained in the medium drive section 36 of the recording/reproduction processing section 33 or reproduces the program of the channel specified by the user and displays the images of the program according to the reproduced video signals while it outputs the voices and music of the program to the speaker 35 according to the reproduced audio signals. Additionally, the recording/reproduction processing section 33 generates program information Inf-P for identifying the program and supplies it to the bookmark information processing section 20.

Program information Inf-P is information relating to the title of a program and the duration of the program to be reproduced. The specific configuration of the recording/reproduction section 30 will be described in greater detail hereinafter. Program information Inf-P will also be described in greater detail hereinafter.

The bookmark information processing section 20 includes a bookmark information association processing section 21 for associating each user with bookmark information, using the user ID information Inf-U recognized by the individual identification processing section 13 of the personal identification processing section 10 and the program information Inf-P delivered from the recording/reproduction processing section 33 of the recording/reproduction section 30, adding/updating the bookmark information in a manner as will be described hereinafter and generating an unviewed program menus for each user according to the bookmark information of the user and a bookmark information holding section 22 for holding the bookmark information of each user generated by the bookmark information association processing section 21 in a writable memory such as RAM.

For the purpose of the present inventions bookmark information includes the program ID of each program booked for the user, the viewed hours or the viewed span (if a program is viewed onto partly) and the total program hours. The bookmark information is associated with the individual user and stored in the bookmark information holding section as a set of pieces of information. Bookmark information will be described in greater detail hereinafter.

Now, the configuration of a principal part and the operation of the embodiment will be described in greater detail belew. Firstly, the face recognition processing section 12 of the personal identification processing section 10 will be described in detail. The face recognition processing section 12 is realized by applying the image processing method disclosed in Jpn. Pat. Appln. Laid-Open Publication No. 2003-271958 filed by the applicant of the present invention. The image processing method is an image input method adapted to detect a face image from the input image and then detect characteristics of the face from the face image so that face may be recognized by approximating the distribution of the individual face data, including the face image and the face characteristics information, to the Gaussian distribution. It includes a face recognition step of recognizing a face by determining the probability density distribution from the covariance matrix determined in advance on an assumption that the covariance matrix of the distribution of individual face data that are stored in a learning database prepared as a result of a learning session conducted in advance on a plurality of faces of a plurality of individuals is common to all individual faces and the registered average face image vector determined in advance by averaging the face image vectors of a plurality of faces of each individual.

Figure 2:
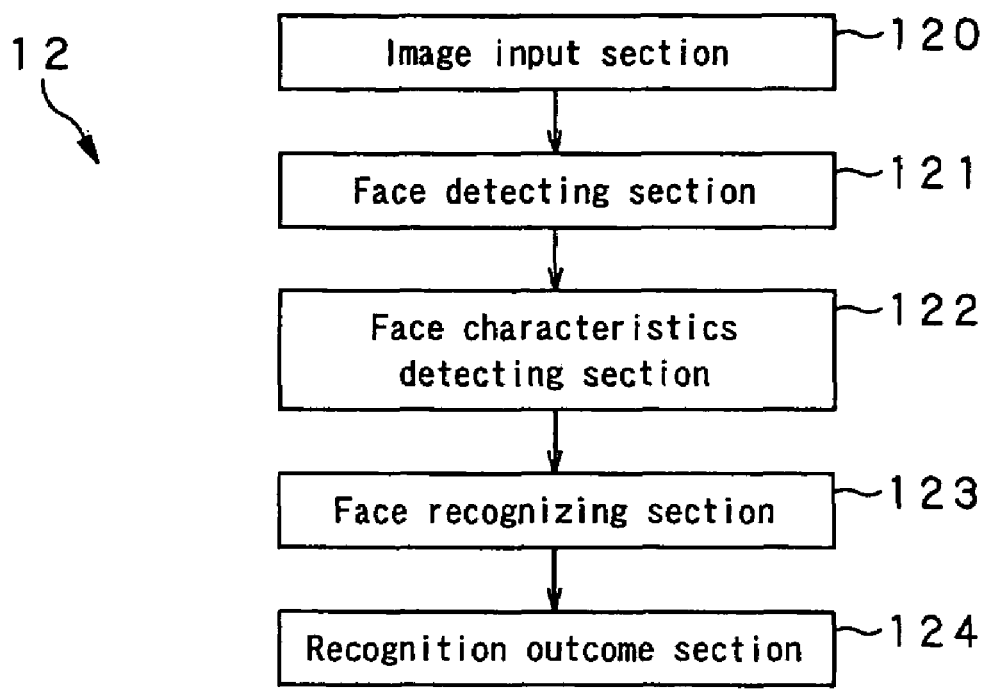
FIG. 2 is a schematic block diagram of the face recognition processing section.

FIG. 2 is a schematic block diagram of the face recognition processing section 12 of the apparatus of FIG. 1 that is adapted to apply the above-described image processing method. As shown in FIG. 2, the face recognition processing section 12 includes an image input section 120 for converting the video signals from the camera 11 into digital signals and receiving them as input, a face detecting section 121 for detecting a face from the digital video signal of the image input section 120, a face characteristics detecting section 122 for receiving face image information from the face detecting section 121 as input and detecting face characteristics information from the face image information, a face recognizing section 123 for receiving the face image information and the face characteristics information as input and recognizing the face by approximating the distribution of the individual face data to the Gaussian distribution and a recognition outcome section 124 for outputting the outcome of the face recognizing process of the face recognizing section 123. The face recognition processing section 12 also has a learning database (not shown) prepared as a result of a learning session conducted in advance on a plurality of faces of a plurality of individuals so that each of the face detecting section 121, the face characteristics detecting section 122 and the face recognizing section 123 can take out necessary data and process the taken out data.

The learning database contains the common covariance matrix $\Sigma$ determined on an assumption that the covariance matrix of the distribution of individual face data is common to all individual faces, the average face image vector (registered average face image vector) determined in advance by averaging the face image vectors of a plurality of faces of each individual and information on the number of face images obtained as a result of learning, and the face recognizing section 123 recognizes a face by determining the probability density distribution, using the common covariance matrix $\Sigma$ and the registered average face image vector.

Now, the operation of the face recognition processing section 12 will be described specifically below.

The image input section 120 converts the video signals from the camera 11 into digital signals and inputs them to the face detecting section 121. The face detecting section 121 extracts the region of a face image included in the image converted into digital signals and inputs the extracted face image region to the face characteristics detecting section 122. The face characteristics detecting section 122 detects face characteristic positions, such as eyes, nose and mouth, contained in the face image region and supplies the face characteristic positions to the face recognizing section 123 along with the face image detected by the face detecting section 121. The face recognizing section 123 computes the probability density that the face in the input image is that of the person identical with a person having a face stored in the learning database. The recognition outcome section 124 outputs the outcome of the computation of the face recognizing section 123 as an outcome of recognition.

Figure 3:
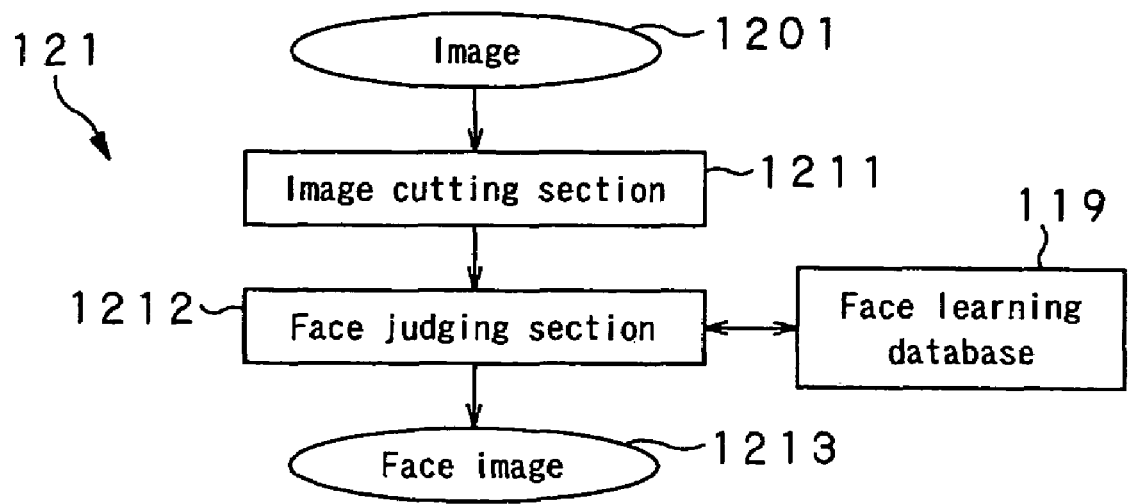
FIG. 3 is a schematic block diagram of the face detecting section.

FIG. 3 is a schematic block diagram of the face detecting section 121. As shown in FIG. 3, the face detecting section 121 includes an image cutting section 1211 and a face judging section 1212. Firstly, an image 1201 is input from the image input section 120 to the face cutting section 1211. The image cutting section 1211 raster-scans all or part of the region of the input image 1201 and cuts images of various sizes that may contain a face therein from the input image 1201. Then, the image cutting section 1211 inputs the cut images it has cut to the face judging section 1212. The face judging section 1212 is connected to the face learning database 119 and judges if each of the cut images is that of a face or not, using the face learning data of the face learning database 119. If one of the cut images is judged to be that of a face, it outputs the face image or the face region information (to be referred to as face image 1213 hereinafter) to the face characteristics detecting section 122. Techniques that the face judging section 1212 can use for judging if an image is that of a face or not include a template matching method that is based on the correlation method and a method that utilizes PCA and an SVM (support vector machine).

Figure 4:
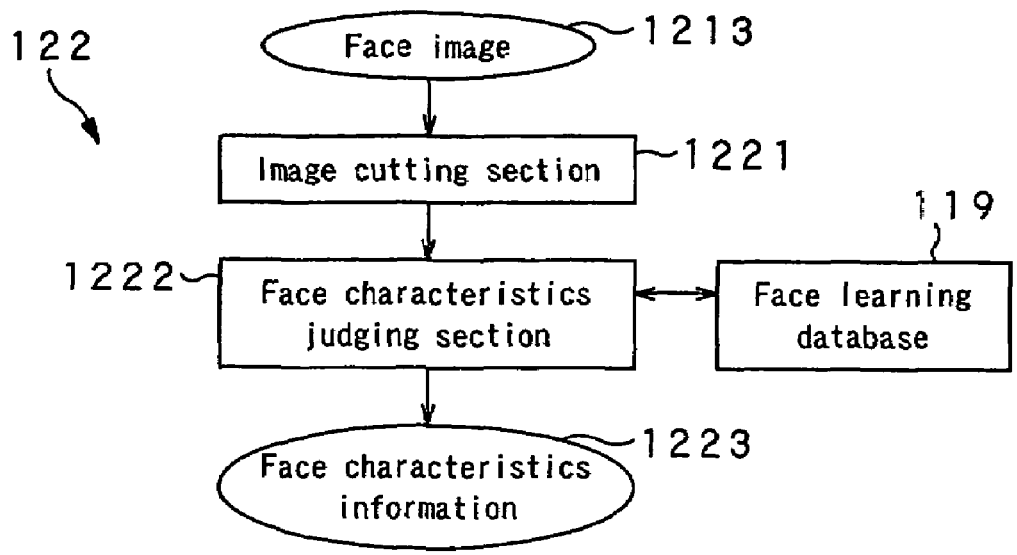
FIG. 4 is a schematic block diagram of the face characteristics detecting section.

FIG. 4 is a schematic block diagram of the face characteristics detecting section 122. As shown in FIG. 4, the face characteristics detecting section 122 includes an image cutting section 1221 and a face characteristics judging section 1222. As a face image 1213 is input form the face detecting section 121, the image cutting section 1221 of the face characteristics detecting section 122 raster-scans all or part of the region of the input image 1201 and cuts images of various sizes that may contain one or more than one characteristic parts of a face, therein such as eyes, a nose and/or ears, from the input image 1201, like the image cutting section 1221 of the face detecting section 121. Then, the image cutting section 1221 inputs the cut images it has cut to the face characteristics judging section 1222. The face characteristics judging section 1222 is connected to the learning database 119 and judges if each of the cut images shows one or more than one characteristic of a face or not, using the face learning data of the face learning database 119. If one of the cut images is judged to show one or more than one characteristics of a face, it outputs the face characteristics information 1223 indicating the positions of the face characteristics as an outcome of examination. Like the face judging section 1212 of the face detecting section 121, techniques that the face characteristics judging section 1222 can use for judgment include a template matching method that is based on the correlation method and a method that utilizes PCA and an SVM.

Figure 5:
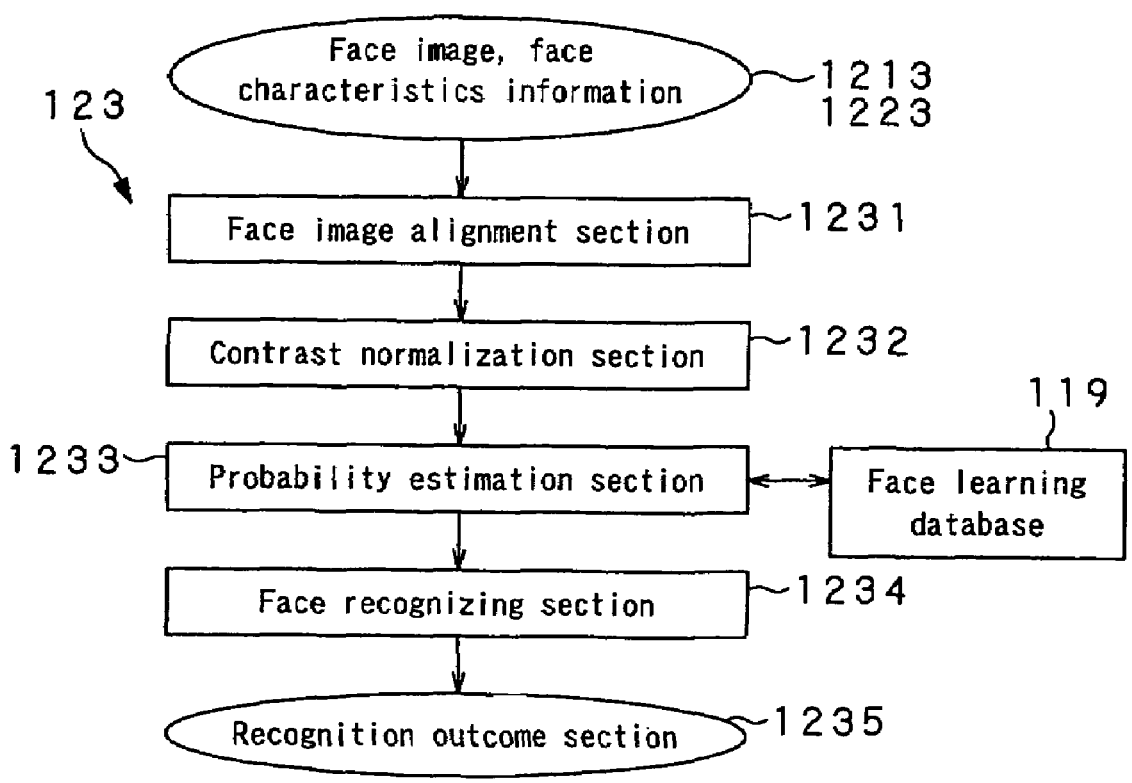
FIG. 5 is a schematic block diagram of the face recognizing section.

FIG. 5 is a schematic block diagram of the face recognizing section 123. As shown in FIG. 5, the face recognizing section 123 includes a face image alignment section 1231 for receiving the face image 1213 from the face detecting section 121 as inputs and the face characteristics information 1223 from the face characteristics detecting section 122, a contrast normalization section 1232, a probability estimation section 1233 and a face recognizing section 1234.

The face alignment section 1231 receives the face image 1213 and the face characteristics information 1223 respectively from the face detecting section 121 and the face characteristics detecting section 122 as inputs. The face alignment section 1231 executes a morphing process, such as affine transformation, in order to bring each face characteristic position to a predetermined reference position. The data produced by the morphing process are input to the contrast normalization section 1232. The contents normalization section 1232 adjusts the contrast of the face image in order to realize uniform lighting conditions and other conditions for the face image after the morphing process. The face image whose contract is adjusted (face image vector) is input to the probability estimation section 1233.

The probability estimation section 1233 is connected to the learning database 119 and executes a matching process for the registered faces stored in the learning database 119 and the face image whose contrast is adjusted so as to estimate the probability of the same and identical person. In other words, the probability estimation section 1233 determines the probability that the input face image vector is a registered individual on the basis of an input face image vector and the common covariance matrix $\Sigma$, the average registered face vector and other data registered in the learning database 119. The outcome of the estimation is output to the recognition outcome section 1234. The recognition outcome section 1234 outputs the face of the person who is most probably the same and identical with the input face out of the faces registered in the learning database 119. While the person who is most probably same and identical with the person of the input face may be determined on the basis of the above-described probability, the accuracy of recognition is improved by analyzing the time series information on the outcome of estimation of the probability estimation section 1233, so as to input the face of the person who is most probably the same and identical with the person of the input face.

In this way, the face recognition processing section 12 can dramatically reduce the amount of data to be used for the process by means of approximation to the Gaussian distribution, using the common covariance matrix or the covariance matrix that is common to all individual faces. As a result, it is possible to recognize a face on a real time basis. Conventionally, while a single face image is registered for each individual, the average face image of a plurality of face images of the same person is registered as registered data for the purpose of the present invention. Thus, while the recognition rating is conventionally low when the registered face of a person is not clear or when the facial expression and the lighting environment are not standard, the accuracy of face recognition is dramatically improved in the face recognition processing section 12 because the average face image vector of each person is used as registered data.

Thus, the individual identification processing section 13 identifies an individual on the basis of the face information recognized by the face recognition processing section 12 and generates user ID information Inf-U for the individual on the basis of the outcome of the identification.

Figure 6:
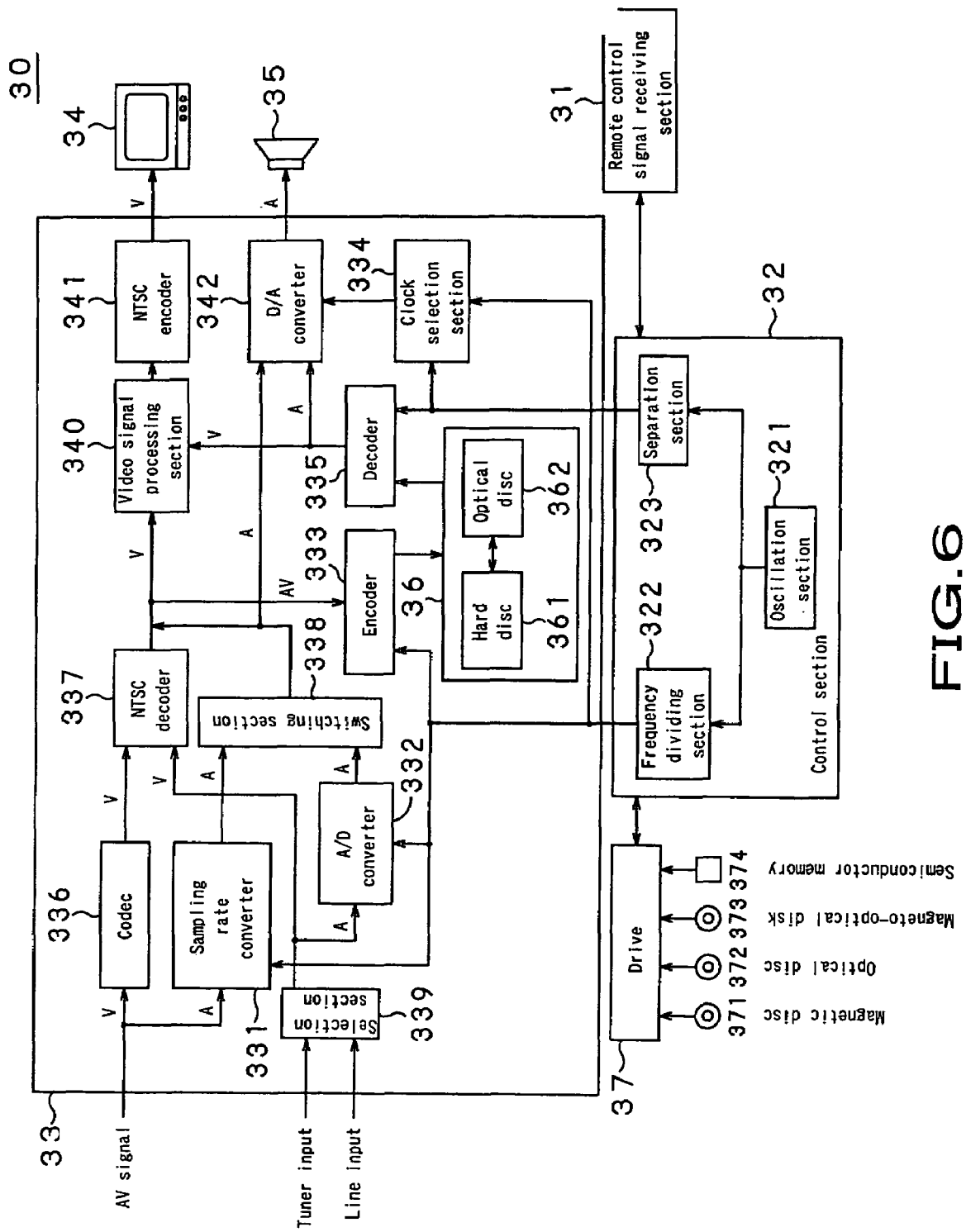
FIG. 6 is a schematic block diagram of the recording/reproduction section.
Figure 9:
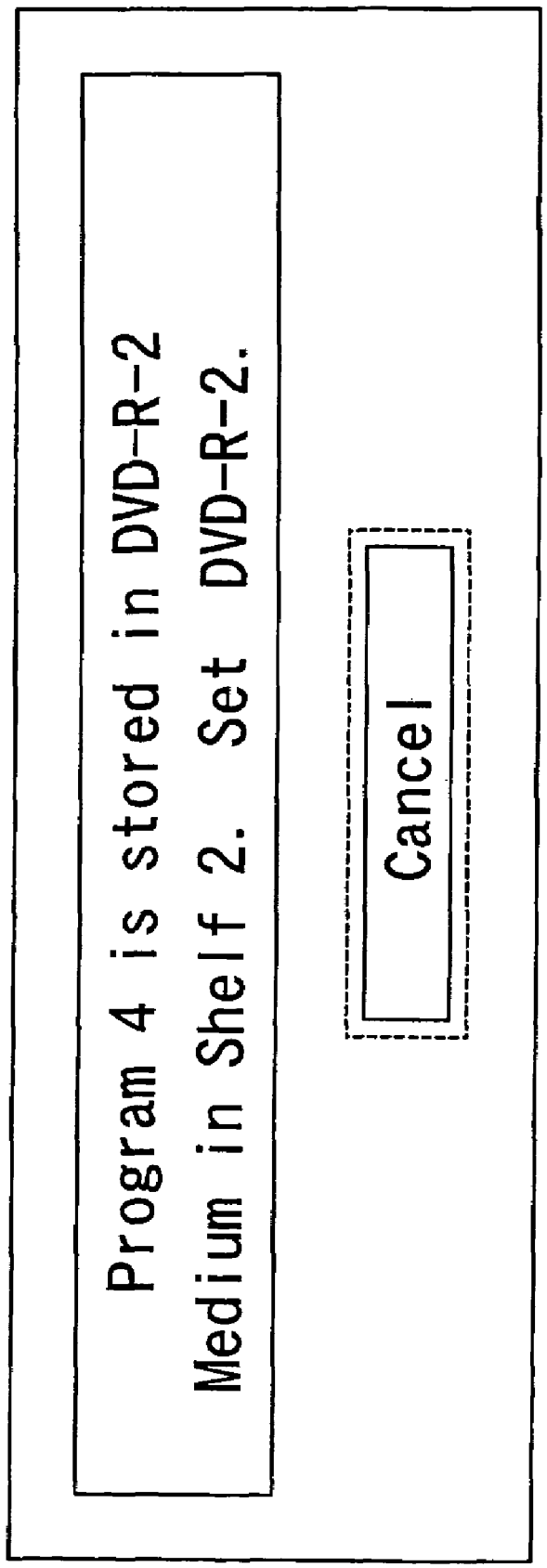
FIG. 9 is a schematic illustration of an image that may be displayed on a display screen when a user selects a program recorded on a removable disc.

Now, the recording/reproduction section 30 will be described in greater detail by referring to FIG. 6. The recording/reproduction section 30 includes a medium drive section 36 and records contents information, such as AV (audio/video) signals or reproduces contents information, from a hard disc 361 or an optical disc 362. The AV signals recorded on or reproduced from the medium drive section 36 are output to the television receiving set 34 and the speaker 35. The user specifies the AV signals being recorded or those being reproduced to be output to the television receiving set 34 and the speaker 35 by way of the remote controller 2 and the remote control signal receiving section 31.

The recording/reproduction control section 32 controls the different sections of the recording/reproduction section 30 according to the command input from the remote control signal receiving section 31 in response to the user operation. For example, the recording/reproduction control section 32 generates a master clock of a fixed frequency by means of the oscillator 321 it contains and supplies the clock to a frequency dividing section 322 and a frequency dividing section 323. The clock (to be used for recording or reproduction by means of the hard disc 361) produced by dividing the frequency of the master clock to a predetermined ratio by means of the frequency dividing section 322 is supplied to a sampling rate converter 331, an A/D converter 332, an encoder 333 and a clock selection section 334 that are located in the block of the recording/reproduction processing section 33. On the other hand, the clock (to be for recording or reproduction by means of the optical disc 362) produced by dividing the frequency of the master clock to a predetermined ratio by means of the frequency dividing section 323 is also supplied to a decoder 335 and the clock selection section 334.

For example, the digital AV signals transmitted by way of i.LINK (tradename) or the digital AV signals received by a digital BS (broadcasting satellite)/CS (communications satellite) tuner (not shown) and output from it are input to codec 336. The codec 336 releases (expands) the compressed video signals out of the input digital AV signals and outputs them to NTSC decoder 337.

The sampling rate converter 331 converts the sampling rate of the digital audio signals of the input digital AV signals to a different sampling rate and outputs them to switching section 338.

The selection section 339 selects either the input from an analog tuner (not shown) or the analog line input according to the user operation and outputs the analog video signals and the analog audio signals it selects respectively to the NTSC decoder 337 and the A/D converter 332.

The A/D converter 332 converts the input analog audio signals into digital audio signals and outputs them to the switching section 338.

The switching section 338 selects either the digital audio signals input from the sampling rate converter 331 or the analog audio signals input from the A/D converter 332 according to the user instruction.

The NTSC decoder 337 converts the analog video signals input from the codec 336 or the analog video signals input from the selection section 339 into NTSC digital video signals and synthetically combines them with the digital audio signals output from the switching section 338. Then, it outputs the synthesized signals.

The synthesized digital AV signals are input to the encoder 333, encoded by the predetermined system, supplied to the medium drive section 36, and recorded on the hard disc 361, for example.

Of the synthesized digital AV signals, the digital video signals are supplied to the video signal processing section 340. The video signal processing section 340 is also supplied with the digital video signals of the digital AV signals reproduced by the medium drive section 36 from the hard disc 361 or the optical disc 362 and decoded by the decoder 335.

The video signal processing section 340 synthesizes an image of a frame from digital video signals supplied from the NTSC decoder 337 and the decoder 335 and supplies the digital video signals of the image to the NTSC encoder 341. The NTSC encoder 341 encodes the input digital video signals to NTSC video signals and outputs them to the television receiving set 34.

The D/A converter 342 converts either the digital audio signals of the digital AV signals output from the NTSC decoder 337 or the digital audio signals of the digital AV signals output from the decoder 335 into analog signals and outputs them to the speaker 35.

Whenever necessary, the control section 2 is connected to the drive 37, whenever necessary. When necessary, the drive 37 is mounted by a magnetic disc 371 (which may by a flexible disc), an optical disc 372 (which may be a CD-ROM (compact disc—read only memory) a DVD (digital versatile disc)), a magneto-optical disc 373 (which may be an MD (mini-disc)) or a semiconductor memory 374 to exchange data with the latter.

When the medium drive section 36 in the recording/reproduction processing section 33 records a program on the hard disc 361, the recording/reproduction section 30 generates program information Inf-P for identifying the program and supplies it to the bookmark information processing section 20.

The program information Inf-P includes the program ID, the title of the program, information on the length of the program data or the program reproduction hours, the storage position (storage pointer) of the program data and so on. Here, "the storage position (storage pointer) of the program data" refers to the address on the hard disc where the program data are recorded when the program is recorded on the hard disc 361 and to the disc ID and the address on the disc where the program data are recorded when the program is recorded on a removable disc medium.

Now, the operation of the bookmark information processing section 20 will be described in detail. As described above, the bookmark information association processing section 21 generates bookmark information on each user by associating the user ID information Inf-U recognized by the individual identification processing section 13 of the personal identification processing section 10 and the program information Inf-P delivered from the recording/reproduction processing section 33 of the recording/reproduction section 30. The bookmark information holding section 22 holds the bookmark information of each user generated by the bookmark information association processing section 21 on a writable memory, such as a RAM.

FIG. 7 schematically illustrates bookmark information that may be held in the bookmark information holding section 22, as an example. In this example, three Users A, B and C are registered. Each user can register his or her own name, nickname and so on as his or her user ID information Inf-U. In the following description, the users are referred to as User A, User B and user C. In other words, User A, User B and User C are specific examples of user ID information Inf-U identified by the personal identification processing section 10.

While programs with IDs 1 through 8 are involved, the programs with IDs 1, 4, 6, 7 and 8 remain. In other words, the programs with IDs 2, 3 and 5 are not recorded or erased because they are already viewed. Additionally, movies with IDs I and II that are recorded on a DVD are registered.

The bookmark of each user ID bears the program ID or IDs and/or the DVD movie ID or IDs that the user has booked for recording (to be referred to generally as "program ID or IDs" hereinafter), the viewed hours and the total program hours.

The bookmark information illustrated in FIG. 7 tells the following. For example, it is safe to say that User A has not viewed the program with program ID "4" by seeing that the viewed hours/total program hours are (0:00/2:00). Similarly, it is safe to say that User A has not viewed the program with program ID "7" (0:00/1:00) but has viewed the program with program ID "8" by 45 minutes out of the total duration of the program of 60 minutes (0:45/1:00). Additionally, it is also safe to say that User A has not viewed the DVD movie with program ID "I" and the DVD movie with program ID "II" yet.

It is also safe to say that User B has not viewed the program with program ID "4". Similarly, it is safe to say that User B has not viewed the program with program ID "6" but has already viewed the DVD movie with program ID "I" (2:30/2:30). However, User B has not viewed the DVD movie with program ID "II".

Likewise, it is safe to say that User C has viewed the program with program ID "1" by 1:00. Similarly, it is safe to say that User C has viewed the program with program ID "6" by 15 minutes. Additionally, User C has finished viewing the program with program ID "8". User C has also finished viewing the DVD movie with program ID "I" (2:30/2:30) but has not viewed the DVD movie with program ID "II" yet.

From FIG. 7, it is also safe to say that neither user A nor user B has viewed the program with program ID "4". User B and User C have recorded the program with program ID "6", but only User C has viewed it by 15 minutes, and user B has not viewed it yet. Similarly, User A and User C recorded the program with program ID "8" and User C has finished viewing it, but user A still has 15 minutes for viewing it. Of User A, User B and User C, only user A has not viewed the DVD movie with program ID "I". It is also safe to say that User A, User B and User C have not finished viewing the DVD movie with program ID "II".

Bookmark information may contain "the span of viewed hours" in place of "viewed hours". Such a piece of information may be useful when a user viewed part of a program somewhere in the middle.

When the bookmark information holding section 22 holds the bookmark information of each user generated by associating the user ID information Inf-U recognized by the individual identification processing section 13 of the personal identification processing section 10 and the program information Inf-P delivered from the recording/reproduction processing section 33 of the recording/reproduction section 30, additionally it may hold corresponding information, such as the program IDs, program information and medium information. In other words, the bookmark information holding section 22 holds the program IDs that are associated respectively with the program titles, the media IDs, the pieces of information on the locations of the recording media, the pointers of the program data storage addresses on the medium a and the pieces of information on the lengths of the program data. Particularly, the embodiment can adapt itself to various media including removable media as the bookmark information holding section 22 holds medium IDs, information on the locations of recording media pointers of program data storage addresses and information media information on the lengths of program data.

FIG. 8 is a schematic illustration of correspondence between program IDs and program titles (information) and media information. Note that FIG. 8 corresponds to the program IDs "1", "4", "6", "7", "8", "I" and "II" shown in FIG. 7. The medium IDs and locations of various media serve as auxiliary information when the user selects a medium, whereas pointers to program data and the length of program data are required by the system at the time of reproducing and/or erasing a program and updating the bookmark information.

The program IDs "1" through "4" represent the programs recorded on DVDs-R that are removable discs. The program IDs "5" through "8" represent the programs recorded on the hard disc. The program IDs "I" and "II" represent the movie contents of DVDs.

The program ID "1" represents the program "History Road" that is recorded on a DVD-R with medium ID "DVD-R-1", which DVD-R is located on "Shelf 1", and has a pointer for the program data of "0x00000000" and a program data length of "1:00" hour. The program ID "4" represents program the "Music Concert 21" that is recorded on a DVD-R with medium ID "DVD-R-2", which DVD-R is located on "shelf 2", and has a pointer for the program data of "0x080AD6B9" and a program data length of "2:00" hours.

The program ID "6" represents the program "Early Morning News" that is recorded on the hard disc with medium ID "HD", which hard disc is "contained in main body", and has a pointer for the program data of "0x20C0D607" and a program data length of "0:30" hours. The program ID "7" represents the program "Everyday Cooking" that is recorded on the hard disc with medium ID "HD", which hard disc is "contained in main body", and has a pointer for the program data of "0x4A50D923" and a program data length of "1:00" hour. The program ID "8" represents the program "TV clinic" that is recorded on the hard disc with medium ID "HD", which hard disc is "contained in main body", and has a pointer for the program data of "0x7B262C98" and a program data length of "1:00" hour.

The program ID "I" represents the program "Giant Cong" that is recorded on a DVD with medium ID "DVD-1", which DVD is located on "Shelf 2", and has a pointer for the program data of "0x00000000" and a program data length of "2:30" hours. The program ID "II" represents the program "Star Fighters" that is recorded on a DVD with medium ID "DVD-2", which DVD is located on "Shelf 2", and has a pointer for the program data of "0x00000000" and a program data length of "2:15" hours.

Thus, when the user specifies program ID "4" and wants to have it replayed, the recording/reproduction apparatus displays "Set DVD-R-2 on Shelf 2" on the display screen of the television receiving set 34 by referring to the above information and requests the user to set the medium in position.

The bookmark information reproducing section 20 adds information to and updates the existing bookmark information in response to the user's operation for replaying a program or the outcome of the identifying operation of the personal identification processing section 10. To be more specific, the recording/reproduction apparatus stops replaying at the timing as described below and updates the viewed hours in the bookmark information. For example, the timing will come when the personal identification processing section 10 detects a state where the user's face is not recognized, probably because the user has left his or her position in front of the television receiving set, when the personal identification processing section 10 recognizes that some other user joins and starts viewing the program that is being replayed, when the user turns off the power switch or shifts the channel of the television receiving set or when the user registers an unviewed program as a viewed program (so that it is recorded in the bookmark information that the user has finished viewing the program). Now, the process of adding information to and updating the existing bookmark information will be described in greater detail hereinafter by referring to FIG. 10.

Firstly, the processing sequence of the recording/reproduction apparatus using bookmark information will be described below. An operation as described below may typically take place to use bookmark information. When the user sits in front of the television receiving set, the recording/reproduction apparatus displays the list of the recorded programs including the programs the user has viewed only partly (personal recorded program progress table). Then, the user can select the program he or she wants to watch or the span of a program he or she wants to watch. If there are two or more than two users sitting in front of the television receiving set, the recording/reproduction apparatus displays the list of the programs that all the users have not viewed, including the programs that the users have viewed only partly, so that they may watch a program together. More specifically, when User B starts viewing a program and comes to the point that user A has already viewed, the recording/reproduction apparatus displays a message telling both User A and User B that they can watch the program together. If the medium is a reusable medium, the recording/reproduction apparatus displays a message telling the users that they can erase the recorded program when all the users have viewed it.

Figure 10:
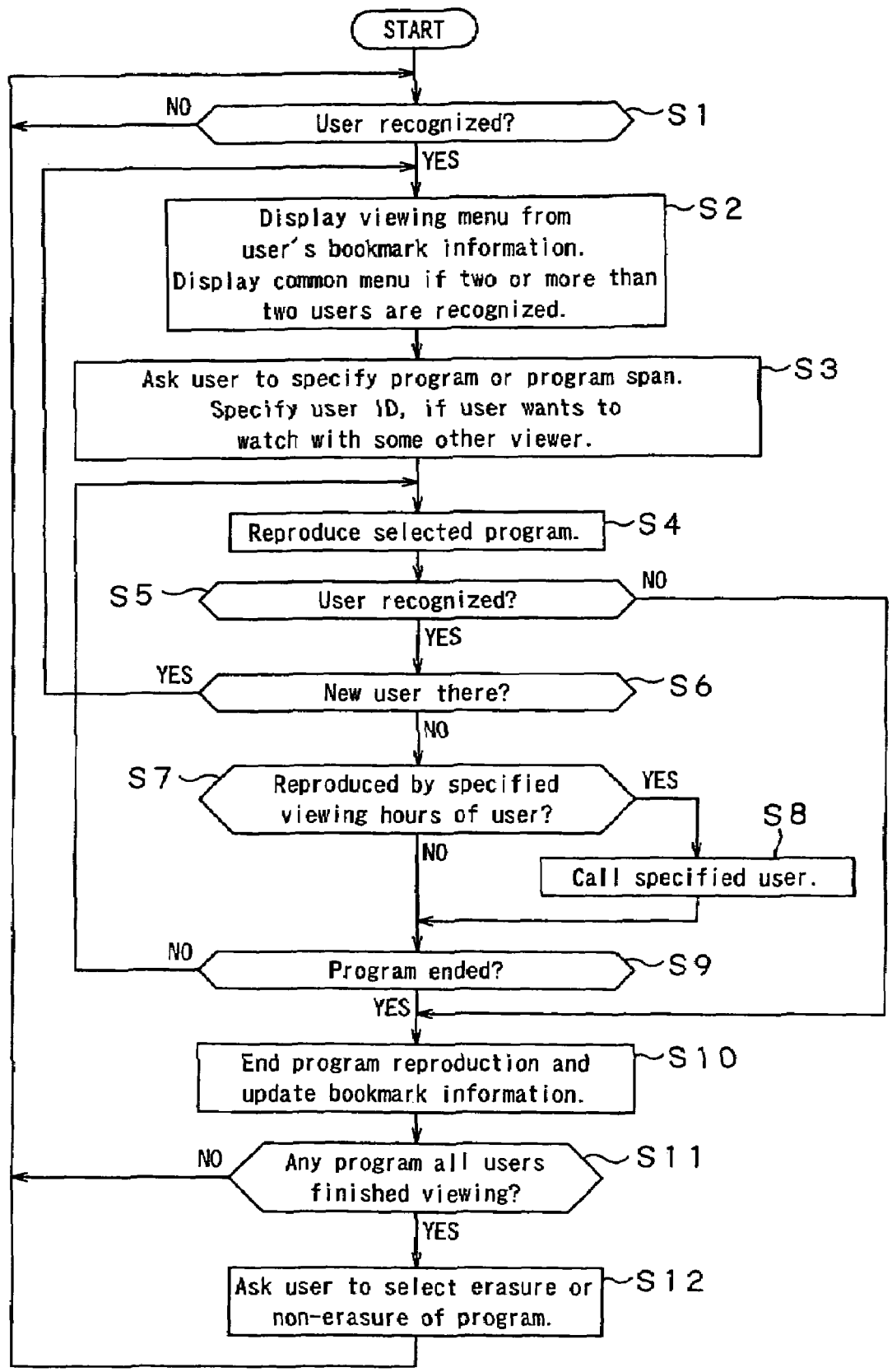
FIG. 10 is a flowchart of the processing operation of a recording/reproduction apparatus using bookmark information.

FIG. 10 is a flowchart of the processing operation of a recording/reproduction apparatus using bookmark information. It additionally shows the process of adding information to and updating the existing bookmark information.

When the power supply switch of the recording/reproduction apparatus is turned on, the personal identification processing section 10 determines if one or more than one user is sitting in front of the television receiving set 34, and it recognizes so on the basis of the image obtained by the camera 11, by using the camera 11, the face recognition processing section 12 and the individual identification processing section 13 (Step S1).

If a user is recognized in Step S1 (YES), the bookmark information processing section 20 displays the viewing menu on the display screen of the television receiving set 34 according to the bookmark information of the user recognized in Step S1. If two or more than two users are recognized, the bookmark information processing section 20 displays a menu that is common to the two or more than two users (Step S2).

In Step S2, the bookmark information association processing section 21 of the bookmark information processing section 20 retrieves the unviewed program menu of the user on the basis of the bookmark information as shown in FIG. 7 and the program information as shown in FIG. 8 and displays the unviewed program menu on the display screen of the television receiving set 34 by way of the recording/reproduction section 30. Then, the user can select the program he or she wants to watch out of the unviewed program menu by operating the remote controller 2.

Figure 11:
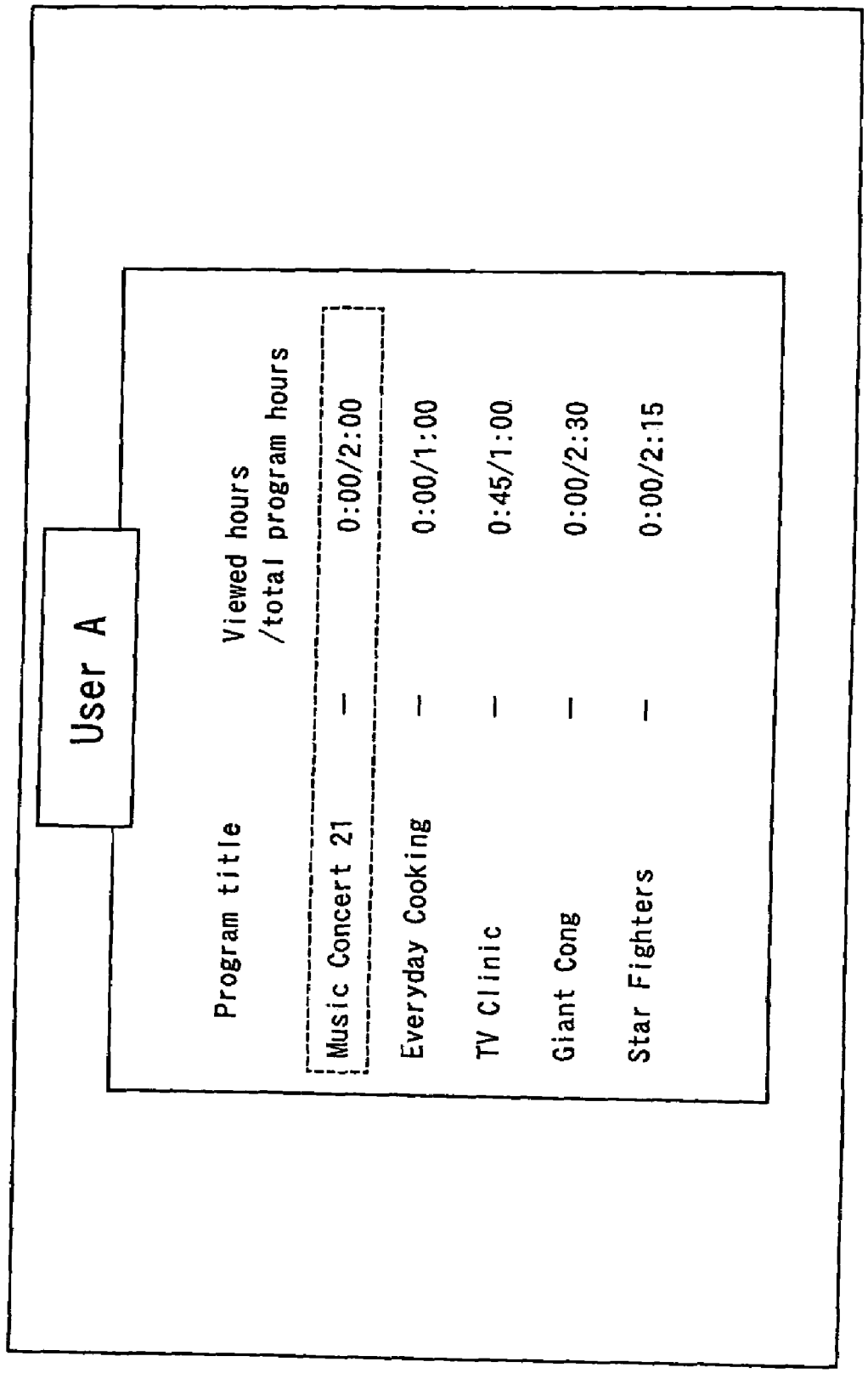
FIG. 11 is a schematic illustration of an image of a selection menu displayed for reproducible programs only for user A.

FIG. 11 is a schematic illustration of an image of the unviewed program menu displayed on the display screen of the television receiving set 34 by the bookmark information processing section 20 by way of the recording/reproduction section 30 only for User A. It will be seen that the user has viewed the program "Music Concert 21" by (0:00/2:00), the program "Everyday Cooking" by (0:00/1:00), the program "TV Clinic" by (0:45/1:00), the program "Giant Cong" by (0:00/2:30) and the program "Star Fighters" by (0:00/2:15) (the unviewed program menu shows the programs with viewed hours short of the total program hours).

If two or more than two users are recognized by the personal identification processing section 10 in Step S2, the bookmark information processing section 20 displays the unviewed program menu that is common to the two or more than two users on the display screen of the television receiving set 34 by way of the recording/reproduction section 30. If the recognized users are User A and User B in FIG. 7, the unviewed program menu that is common to the Users A and B includes the programs with program IDs of "4" and "II" as seen from the bookmark information of FIG. 7.

Figure 12:
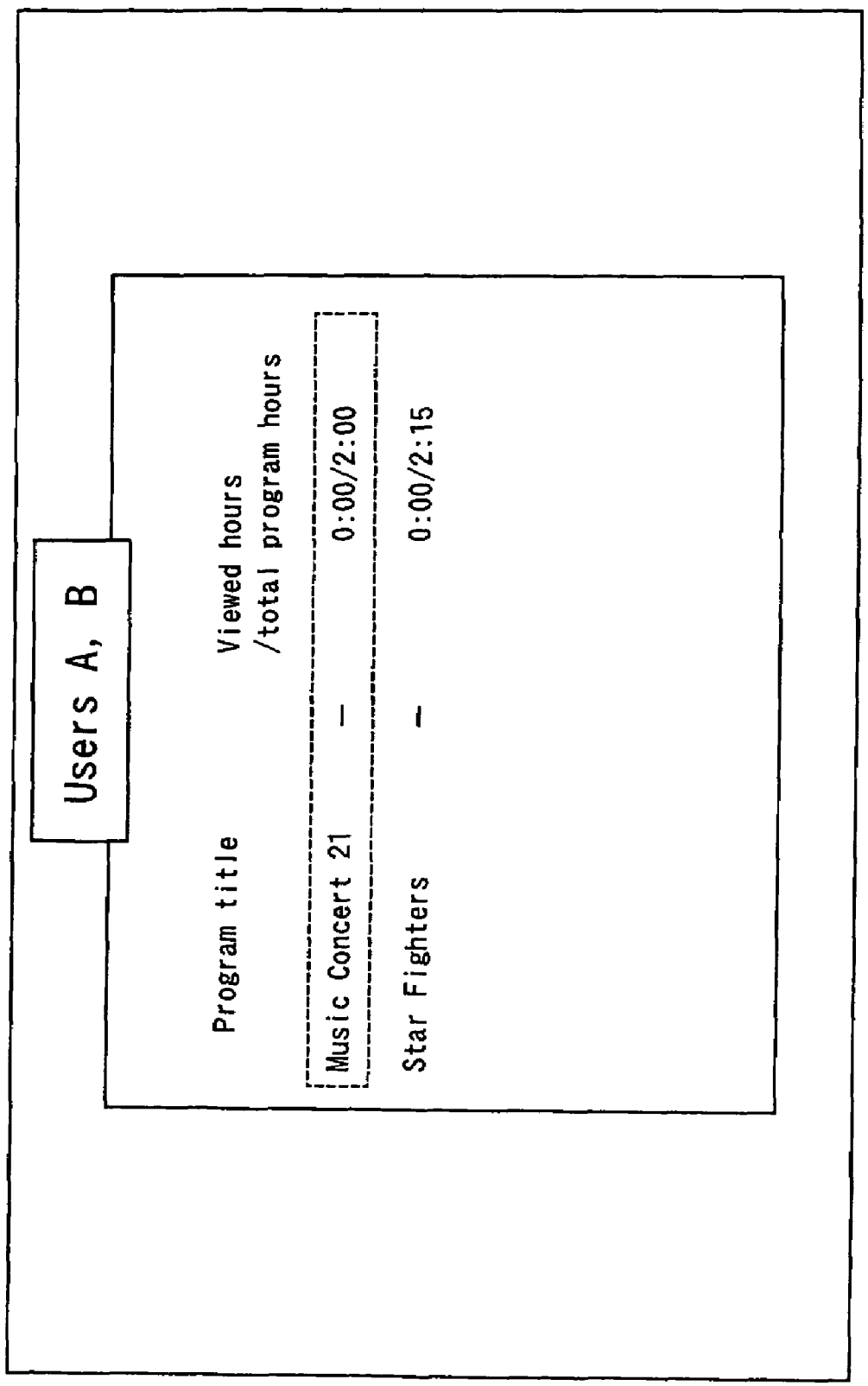
FIG. 12 is a schematic illustration of an image of a selection menu displayed for reproducible programs for user A and user B.

FIG. 12 is a schematic illustration of an image of the unviewed program menu that the bookmark information processing section 20 displays on the display screen of the television receiving set 34 by way of the recording/reproduction section 30 when the personal identification processing section 10 recognizes user A and user B sitting in front of the television receiving set 34. As listed above, the unviewed programs that are common to user A and user B include the "Music Concert 21" with program ID "4" and the "Star Fighters" with program ID "II".

In Step S2, the user (or users) can select a program or a program span by means of the remote controller by referring to the unviewed program menu displayed for the user (or users) on the display screen of the television receiving set 34 by the bookmark information processing section by way of the recording/reproduction section 30 (Step S3). If the user wants (or users want) to watch a program with some other user or users, he or she (or they) can specify the user or the users by means of the user ID or user IDs of the other user or users, whichever is appropriate.

For example, when Users B and C are sitting in front of the television receiving set, as shown in FIG. 7, the unviewed program menu that is common to Users B and C are the programs with program IDs of "6" and "II". However, User C has already viewed the program with program ID "6" for 15 minutes. In this case, if Users B and C desire to view the program with program ID "6", users B and C can select whether to call User C after a lapse of 15 minutes.

Figure 13:
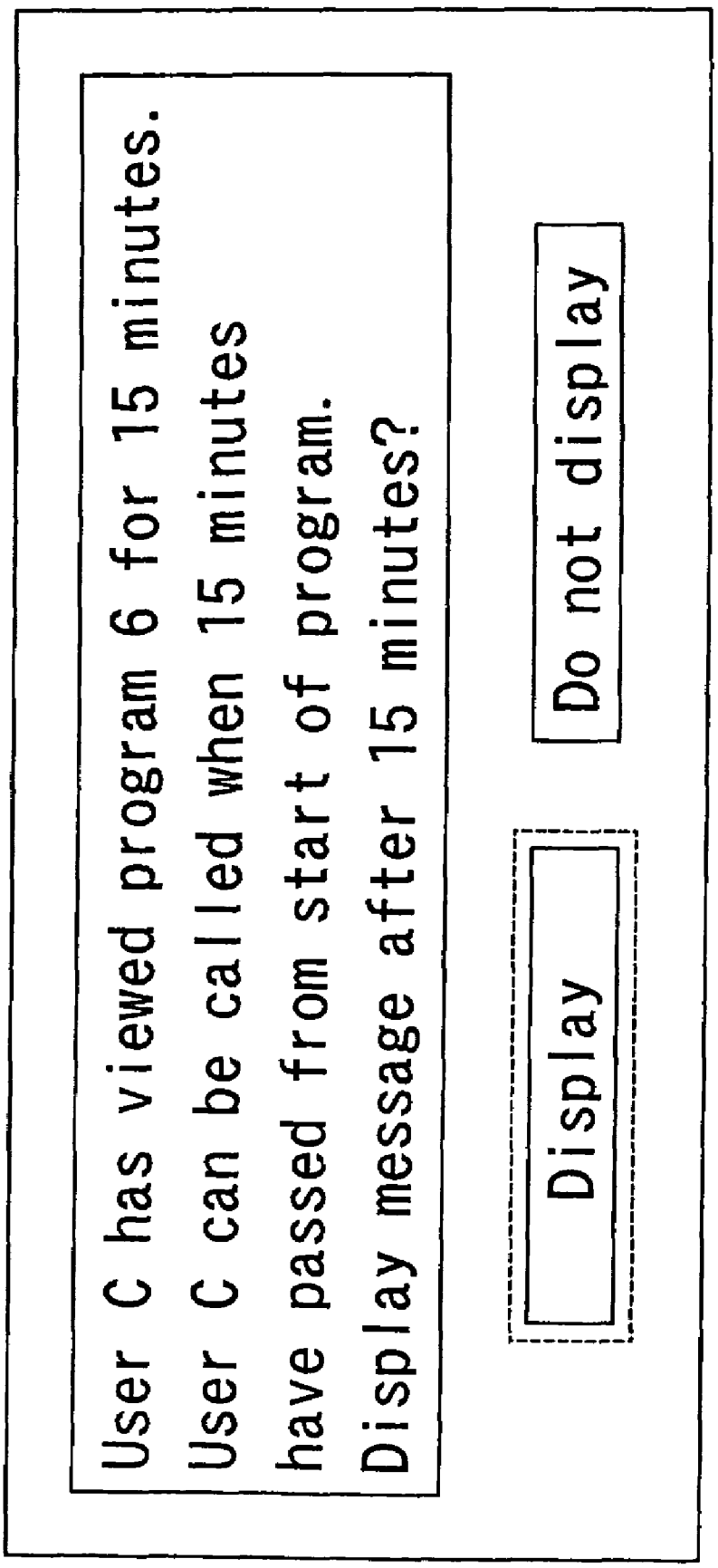
FIG. 13 is a schematic illustration of an image that can be displayed to show a message, asking if user C is to be called or not.

FIG. 13 shows an example of a message displayed on the television receiving set 34 by way of the recording/reproduction section 30. The message says "User C has already viewed the program "6" for 15 minutes. User C can be called when 15 minutes have passed from the start of program. Display message after 15 minutes?" and provides the choices of "Display" and "Do not display." In FIG. 13, "Display" is chosen by User B and uUser C.

Then, the recording/reproduction section 30 replays the program selected by the user in Step S3 (Step S4). While the program is being replayed, the personal identification processing section 10 is constantly recognizing the user or users and, in Step S5, determines if the user is or the users are recognized or not. If the two or more than two users are recognized at the beginning and still remain in front of the television receiving set 34 (YES), it keeps on replaying the program. If two or more than two users are recognized at the beginning and one of the users disappears thereafter, the bookmark information processing section 20 updates the information on the viewed hours in the bookmark information of the disappeared user (Step S9). The recording/reproduction section 30 keeps on replaying the program as long as at least one of the users remains in front of the television receiving set 34 (YES). However, if no one is sitting in front of the television receiving set 34, the recording/reproduction section 30 proceeds to Step S9, where it stops the program replaying operation and updates the bookmark information.

On the other hand, if the personal identification processing section 10 determines that a user newly joins to view the program in Step S6 (YES), the recording/reproduction section 30 returns to Step S2 and displays the unviewed program menu that is common to the users sitting in front of the television receiving set 34, so they may select one of the programs that they can watch together. However, alternatively it may be so arranged that the recording/reproduction section 30 does not display the program menu good for the users including the user who newly joins but simply updates the "viewed program span information" in the bookmark information of the user.

If it is determined in Step S6 that there is no new user (NO), the recording/reproduction section 30 keeps on replaying the program. In Step S7, it is determined if the program is reproduced to the point to which the user specified in Step S3 has been viewed or not.

If, for example, it is determined in Step S7 that the program is reproduced to the point to which the user specified in Step S3 has been viewed (YES), then user B can watch the program together with user C at that time point. Then, the system displays a message telling that reproduction of the program can be suspended to call user C.

Figure 14:
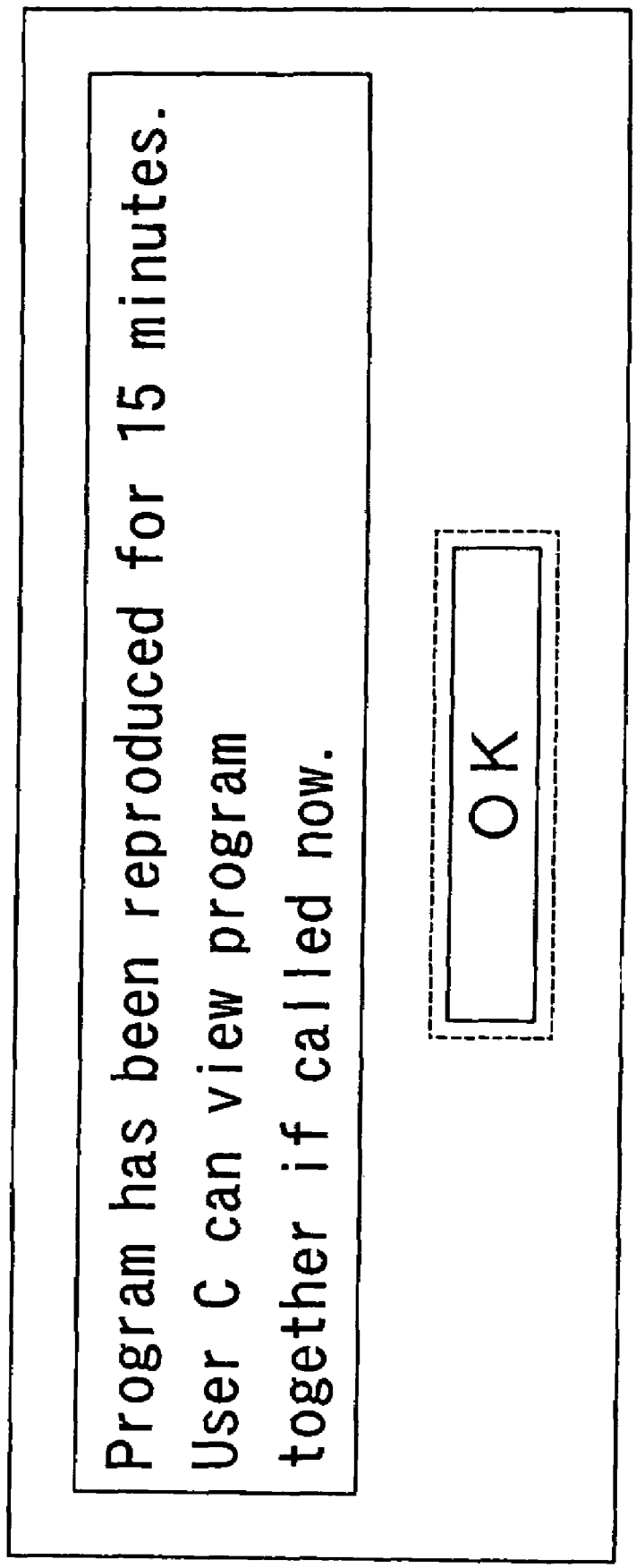
FIG. 14 is a schematic illustration of an image that can be displayed to show a message 15 minutes after showing the message of FIG. 13, asking if user C is to be called or not.

FIG. 14 is a schematic illustration of an image that can be displayed to show a message telling that user can be called. It says "Program has been reproduced for 15 minutes. User C can view program together if called now." This message corresponds to the selection of "Display" in the image shown in Step S3 and described above by referring to FIG. 13. If the user B selects "OK" here and calls the specified user (user C) in Step S8, the user C can watch the remaining part of the program that he or she has not viewed yet with user B, and user C does not need to view the part of the program that he or she, whichever is appropriate, has already viewed.

The system keeps on replaying the program, while repeating the processing operations of Step S5 through Step S8, and determines in Step S9 if the program ends or not. If it is determined in Step S9 that the program ends (YES), it stops replaying the program in Step S10 and updates the "viewed program hours" of each of the users who viewed the program.

Then, in Step S11, the system determines if all the users whose bookmark information registers the program have finished viewing the program or not. If it is determined that all the users have finished viewing the program (YES), the recording/reproduction apparatus displays a message in Step S12 to ask the users if they want to erase the program or not.

Figure 15:
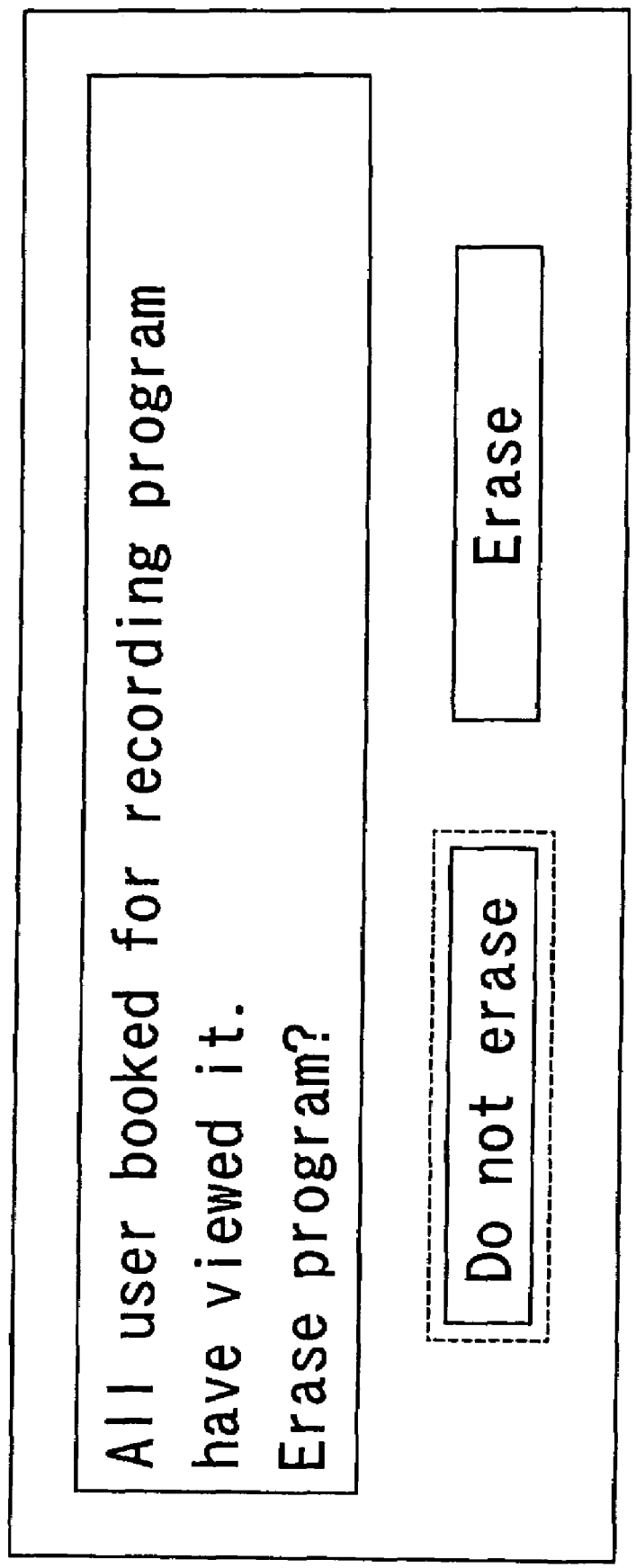
FIG. 15 is a schematic illustration of a message that can be displayed to tell that a program can be erased.

FIG. 15 is a schematic illustration of a message that can be displayed to tell that a program can be erased. It says "All users booked for recording program have viewed it. Erase program?" and provides choices of "Erase" and "Don't erase". Thus, a program that all the booked users have viewed can be erased from the recording medium to allow the medium to be used efficiently.

As described above in detail, according to the present invention, it is no longer necessary for the user or users of a recording/reproduction apparatus according to the present invention to operate the remote controller of the apparatus, which is an operation that may be cumbersome to the user or users, and a report on the viewing situation of the recorded programs is displayed on the display screen of the apparatus and updated automatically. Additionally, the user can select a program he or she has not viewed yet from the program menu displayed to him or her simply when the user sits in front of the television receiving set. Still additionally, if a removable recording medium is involved, the user can save the time necessary for finding it because the recording/reproduction apparatus displays the location where it is stored. If two or more than two users sit in front of the apparatus, the apparatus displays a menu that shows the program or programs that none of the users has viewed so that they can enjoy a same recorded program. If one of the users has viewed a program to a point somewhere on the way, he or she can be called when the program is replayed down to that point so that he or she, whichever is appropriate, is not required to view the same part of the program twice and can enjoy the remaining part of the program together with the other user or users. If a reusable recording medium is used, the apparatus displays a message telling that the recorded program can be erased when all the users booked for the program have viewed it so that the recording medium can be utilized highly efficiently.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   recording/reproduction means for recording a program produced by using video and audio signals to a recording medium contained in and/or removably fitted to the apparatus and reproducing and displaying the program on a display apparatus;
   identification processing means for recognizing and identifying an individual user reproducing and viewing the program recorded on the recording medium; and
   bookmark information processing means for associating each user with bookmark information by using user identification information of the user identified by the identification processing means and program information obtained by the recording/reproduction means, holding the bookmark information associated with each user and controlling the operation of reproducing a program by the recording/reproduction means by using the bookmark information associated with each user, wherein the bookmark information processing means associates the user identification information with program identification information and viewed hours or the span or spans of the program corresponding to the viewed hours.

2. The apparatus according to claim 1, wherein the bookmark information processing means includes bookmark information association processing means for associating the user identification information of each user with the bookmark information of the user by using the program information and bookmark information holding means for holding the associated bookmark information of each user coming from the bookmark information association processing means.

3. The apparatus according to claim 1, wherein the bookmark information processing means adds program titles and program data lengths to the program identification information to be associated with the user identification information.

4. The apparatus according to claim 3, wherein the bookmark information processing means further adds medium identification information, information on the location of each medium and a pointer indicting the program storing address on the medium to the program identification information to be associated with the user identification information.

5. The apparatus according to claim 1, wherein the bookmark information processing means adds/updates the bookmark information according to the outcome of recognition of the identification processing means.

6. The apparatus according to claim 1, wherein the bookmark information processing means updates the viewed hours or the span or spans of the program corresponding to the viewed hours according to the outcome of recognition of the identification processing means that no user can be identified in front of the display apparatus.

7. The apparatus according to claim 1, wherein the bookmark information processing means updates the viewed hours or the span or spans of the program corresponding to the viewed hours when the identification processing means identifies a user other than the currently viewing user in front of the display apparatus.

8. The apparatus according to claim 1, wherein the bookmark information processing means updates the viewed hours or the span or spans of the program corresponding to the viewed hours when the user in front of the display apparatus turns off the power supply switch of the display apparatus or shifts the channel in operation.

9. The apparatus according to claim 1, wherein the bookmark information processing means updates the viewed hours or the span or spans of the program corresponding to the viewed hours and records the finish of viewing the program when the user in front of the display apparatus registers the unviewed program as a viewed program.

10. The apparatus according to claim 1, wherein the bookmark information processing means displays an individual recorded program progress table of the user on the display apparatus by way of the recording/reproduction means when the identification processing means identifies the user.

11. The apparatus according to claim 1, wherein the bookmark information processing means displays a recorded program processing table common to two or more than two users by way of the recording/reproduction means when the identification processing means identifies the two or more users.

12. The apparatus according to claim 1, wherein the bookmark information processing means displays a message on the display apparatus telling that the recorded program common to a plurality of users can be erased upon confirming that all the plurality of users have finished viewing the program via the recording/reproduction means.

13. An information processing method comprising:
a recording/reproduction step of recording a program produced by using video and audio signals to a recording medium contained in and/or removably fitted to an information processing apparatus and reproducing and displaying the program on a display apparatus;
an identification processing step of recognizing and identifying an individual user reproducing and viewing the program recorded on the recording medium; and
a bookmark information processing step of associating each user with bookmark information by using the user identification information of the user identified in the identification processing step and the program information obtained in the recording/reproduction step, holding the bookmark information associated with each user and controlling the operation of reproducing a program in the recording/reproduction step by using the bookmark information associated with each user, wherein the bookmark information processing means associates the user identification information with program identification information and viewed hours or the span or spans of the program corresponding to the viewed hours.

14. An information processing apparatus comprising:
a recording/reproduction unit that records a program produced by using video and audio signals to a recording medium contained in and/or removably fitted to the apparatus and reproduces and displays the program on a display apparatus;
an identification processing unit that recognizes and identifies an individual user reproducing and viewing the program recorded on the recording medium; and
a bookmark information processing unit that associates each user with bookmark information by using user identification information of the user identified by the identification processing unit and program information obtained by the recording/reproduction unit, holding the bookmark information associated with each user and controlling the operation of reproducing a program by the recording/reproduction unit by using the bookmark information associated with each user, wherein the bookmark information processing means associates the user identification information with program identification information and viewed hours or the span or spans of the program corresponding to the viewed hours.

15. The method according to claim 13, wherein the bookmark information processing step updates the viewed hours or the span or spans of the program corresponding to the viewed hours when the identification processing step identifies a user other than the currently viewing user in front of the display apparatus.

16. The method according to claim 13, wherein the bookmark information processing step updates the viewed hours or the span or spans of the program corresponding to the viewed hours when the user in front of the display apparatus turns off the power supply switch of the display apparatus or shifts the channel in operation.

17. The method according to claim 13, wherein the bookmark information processing step updates the viewed hours or the span or spans of the program corresponding to the viewed hours and records the finish of viewing the program when the user in front of the display apparatus registers the unviewed program as a viewed program.

18. The apparatus according to claim 14, wherein the bookmark information processing unit updates the viewed hours or the span or spans of the program corresponding to the viewed hours when the identification processing unit identifies a user other than the currently viewing user in front of the display apparatus.

19. The apparatus according to claim 14, wherein the bookmark information processing unit updates the viewed hours or the span or spans of the program corresponding to the viewed hours when the user in front of the display apparatus turns off the power supply switch of the display apparatus or shifts the channel in operation.

20. The apparatus according to claim 14, wherein the bookmark information processing unit updates the viewed hours or the span or spans of the program corresponding to the viewed hours and records the finish of viewing the program when the user in front of the display apparatus registers the unviewed program as a viewed program.

* * * * *